3,580,726
METHOD OF INCREASING SOLUBILITY OF
FOOD ACIDULENTS
Charles Dame, Jr., Wheaton, Ill., assignor to General
Foods Corporation, White Plains, N.Y.
No Drawing. Continuation-in-part of application Ser. No.
694,417, Dec. 29, 1967, which is a continuation-in-part
of application Ser. No. 370,356, May 26, 1964. This
application Nov. 24, 1969, Ser. No. 879,623
Int. Cl. A23l 1/00; B01j 1/00
U.S. Cl. 99—78                                    4 Claims

ABSTRACT OF THE DISCLOSURE

Ground fumaric or adipic acid is impregnated with an aqueous solution of propylene gylcol, agglomerated, and dried. The dried agglomerates are then subdivided to provide an acid of increased solubility.

CROSS-REFERENCE TO RELATED APPLICATIONS

This application is a continuation-in-part of Ser. No. 694,417, filed Dec. 29, 1967 for Food Acidulents, and now abandoned, which was a continuation-in-part of Ser. No. 370,356, filed May 26, 1964 for Food Acidulents and now abandoned.

BACKGROUND OF THE INVENTION

This invention relates to food acidulents such as fumaric and adipic acids and, in particular, is directed to a method for increasing the cold water solubility of these acidulents. The disclosure contained in this specification, although described in terms of fumaric acid is equally applicable to adipic acid and the term "food acidulent" is to be construed to apply to both acids.

The prior art has recognized the economic and utility advantages of using fumaric acid as a food acidulent in place of citric acid. In addition to being less costly, fumaric acid is less hygroscopic than citric acid and finds wide application in powdered food mixes. Because of their reduced tendency to absorb moisture, dry mixes employing fumaric acid as the acidulent remain in a desirable free flowing condition even after prolonged periods of storage.

Fumaric acid would undoubtedly find wider application in the food industry if it were not for one inadequacy, it does not have a sufficiently rapid solubility rate in cold water to be considered acceptable for use in dry beverage mixes which, according to present commercial standards, are to completely dissolve in the required amount of cold water (40° F.) within one minute, attended with little to moderate stirring.

The use of fumaric acid in dry beverage mixes intended for dissolubility in cold water has been made feasible in the past by certain improvements in the cold water solubility rate of this acidulent. Although many techniques have been disclosed for improving the cold water solubilty rate of fumaric acid, the prior art has concentrated on the combined fine grinding of the acidulent and the application of surfactants to the surfaces of the finely ground crystals as the technique having the best potential. The use of this method to improve the cold water solubility rate of fumaric acid, appears to provide the most promising results. However, although having an adequate cold water solubility rate when freshly prepared, finely ground fumaric acid, coated with a surfactant and admixed with the other pulverulent ingredients in a dry beverage food mix has a strong tendency to lose its enhanced cold water solubility capability and, upon storage, will revert to a very difficultly solube material. This is especially the case when a portion, or all, of the pulverulent ingredients in the beverage mix are hygroscopic in nature. It has been suggested that the reversion of the fumaric acid particles to the difficultly cold water soluble condition is brought about during storage through the migration of the surfactant from the surfaces of the acidulent crystals to the more moist hygroscopic ingredients in the beverage mix. Additionally, it has been determined that the finely ground fumaric acid particles, when admixed with the hygroscopic materials of the beverage mix, tend to clump together and form large difficultly soluble agglomerates—this is especially apparent under those circumstances when the surfactant migrates from the acid particles and the dampened acid particles contact each other and the hygroscopic material with no interposing protective barrier. The net result is finely ground fumaric acid particles devoid of substantially all surfactant and a material which therefore does not wet very well. Thus, when the fumaric acid-containing beverage mix is stirred in cold water, the fine acidulent particles float on the surface because of their poor wettability. Experience has shown that it can take as long as 24 hours to dissolve these particles in water at 40° F.

The clumps of fumaric acid crystals sink to the bottom of the container and, although surrounded by water, do not wet well and remain undissolved for extended periods of time, even when subjected to agitation as by vigorous stirring. The overall result is an unsatisfactorily performing dry beverage mix which, when added to cold water (40° F.) results in large, undissolved aggregates of fumaric acid, commonly called "sinkers" collecting at the bottom of the container and fine particles which are not wetted, or "floaters" remaining undissolved on the surface of the beverage.

Although considerable research has been undertaken to determine methods of preventing migration of the surfactant and avoiding the formation of fumaric acid aggregates in order to achieve good dispersion of this acidulent in cold water, these efforts appear to have been only partially successful and, until the present invention, the full potential of utilizing fumaric acid as an effective food acidulent in dry beverage mixes intended for rapid dissolution in cold water, has not been fully realized.

Consequently, there has existed a need for a method of imparting to fumaric acid the desired degree of rapid solubility in cold water, and, more importantly, a method which assures retention by the fumaric acid of its enhanced cold water solubility under prolonged storage when employed as an ingredient in a commercially packaged dry beverage mix.

SUMMARY OF THE INVENTION

Accordingly, it is a principal object of this invention to provide a method of increasing the solubility rate of fumaric acid in cold water.

It is a main object of this invention to provide a method of stabilizing fumaric acid with enhanced cold water solubility rate to the extent it can be used as an ingredient, admixed with pulverulent, hygroscopic ingredients in a packaged dry beverage mix and be stored under commercial marketing conditions for extended periods without losing its improved cold water solubility distinction.

Contrasted with the prior art techniques, it is a feature of this invention that the improvements in the cold water solubility rate of fumaric acid are brought about in a relatively inexpensive manner by the use of a common industrial chemical and efficient processing operations well known in the food industry for the manufacture of dry beverage mixes.

It is another feature of this invention that the additive employed to improve the cold water solubility rate of the fumaric acid crystals does not detract from the intended utility of the acidulent in the dry mix beverage to provide the desired degree of tartness to the constituted beverage and additionally, the additive augments the smooth mouth-feel of the constituted beverage.

Briefly, the above and additional objects and features of the invention are accomplished by fine grinding the fumaric acid to provide a suitably large amount of surface area, impregnating the surfaces of the finely ground fumaric acid crystals with propylene glycol, followed by agglomerating the finely ground fumaric acid particles to form agglomerates of optimum size for dispersion in cold water and, importantly, to entrap a major portion of the propylene glycol impregnated on the individual crystal surfaces within the agglomerates formed thereof.

The gist of the invention resides in the unexpected discovery that propylene glycol alone, when properly impregnated in controlled amounts on the surface of the finely ground fumaric acid crystals and entrapped within the agglomerates formed of the crystals acts to enhance the cold water solubility rate of the acidulent. The propylene glycol, in addition to enhancing the capability of the fumaric acid particles to adhere to each other and thus form agglomerates; also, when contacted with the cold water used for dissolving the beverage mix, facilitates the disintegration of the agglomerates and assures adequate dispersion of the acidulent crystals in the cold water. Thereafter, the propylene glycol, at or near the surface of the dispersed crystals performs as a surfactant to attract and facilitate the wetting of the crystals to initiate their dissolution in the cold water.

DESCRIPTION OF THE PREFERRED EMBODIMENT

The food acidulents used as starting materials according to the present invention are food grade fumaric acid or adipic acid. The commercially available food grade fumaric acid (or adipic acid) having non-uniformly sized particles up to about No. 60 U.S. Standard Sieve size is pulverized to form finely divided particles. By finely divided fumaric acid is meant material having 100% particle-size sufficiently small to pass through No. 400 U.S. Standard Sieve (—400 mesh). Pulverizing is accomplished with standard food pulverizing equipment and the —400 mesh size to which the fumaric acid is subdivided is considered to be about as fine a particle size as can be efficiently obtained without resorting to expensive, specializing mills. The point of the matter being, the finer the fumaric acid crystals the greater the proportion of surface area for impregnation with the propylene glycol; nevertheless, —400 mesh has been shown to be adequate for purposes of the invention and this degree of grinding keeps the processing operations within reasonable economic bounds.

Preferably, the fumaric acid is subdivided when in a slurry compised of the acid particles suspended in an aqueous solution of propylene glycol. The wet pulverization of the fumaric acid enables the propylene glycol to come in intimate contact with the surfaces of the pulverized crystals and be impregnated thereon. There are indications that the propylene glycol is incorporated, at least to a limited extent, within the crystalline lattice structure of the acid when it is so applied.

The concentrations of propylene glycol in the aqueous solution and the ratios of amounts of solution to fumaric acid are employed which will result in the pulverized fumaric acid sorbing between about 0.5% to about 50% of its weight of propylene glycol during the pulverizing process. Preferably the amount of propylene glycol sorbed by the fumaric acid should range from about 2% to 20%. After grinding the fumaric acid to the condition where it all passes through a No. 400 U.S. Standard Sieve, the excess solution is drained and the wetted acid crystals are agglomerated and subsequently dried.

Alternatively, the propylene glycol in the form of a more concentrated aqueous solution can be intimately blended with the commercial fumaric acid starting material to form a wetted mass of crystals with little, if any, "drainable" moisture present and the wetted crystals pulverized to the desired —400 mesh particle size.

The propylene glycol wetted, finely ground fumaric acid crystals are agglomerated by applying the acidulent-glycol composition to the roll surface of an atmospheric drum dryer. This is best accomplished by means of a roll type applicator adjusted to apply a thin coating of the wetted crystals to the drum dryer roll. As the crystals are initially dried they form agglomerates which, at the termination of drying, can be doctored from the drum dryer roll in the form of a fine powder.

The agglomerated product from the drum dryer is then subjected to a granulation operation wherein the agglomerates are gently subdivided to the extent of being able to pass through a No. 120 U.S. Standard Sieve. The small amount of agglomerates which does not fracture when subjected to the gentle mechanical action of the granulator is reprocessed.

The above described procedure, equally applicable to adipic acid, produces a food acidulent composition which has an excellent cold water solubility and which retains this attribute when used as an ingredient admixed with other pulverized material comprising a dry beverage mix and stored over extended periods of time.

This invention will now be more fully described by reference to the following illustrative examples of a method of preparing fumaric acid-propylene glycol agglomerates with sustained capability of rapid solubility in cold water and the dry mixed beverage in which the agglomerated acidulent composition is incorporated as an essential ingredient. Unless otherwise stated all percentages are expressed on a weight basis.

EXAMPLE I (a) About 50 pounds of commercially available food grade fumaric acid was slurried with about 200 pounds of a 10% aqueous solution of propylene glycol.

(b) The slurry of step (a) was passed through an Eppenbach Colloid Mill set at approximately 0.01 inch clearance which pulverized the fumaric acid-glycol material to a degree which permitted the slurry to pass completely through a No. 400 U.S. Standard Sieve.

(c) After draining the excess moisture from the pulverized fumaric acid crystals impregnated with propylene glycol, the wetted, finely ground material was agglomerated by applying it to the hot drum of a single roll atmospheric drum dryer in a very thin layer with a roller adjusted for this purpose. Steam pressure on the drum was maintained to provide a dryer roll temperature to assure adequate drying of the agglomerated crystals to about 2% moisture prior to the agglomerates being doctored from the surface of the drum.

(d) The dried agglomerates of fumaric acid, impregnated with about 5% by weight of propylene glycol, were then reduced in size by gentle granulation in a Colton Granulator.

(e) The granulated agglomerates were then screened through a No. 120 U.S. Standard Sieve. The material passing through the sieve was collected as product and the material retained on the screen was subjected to further granulation and rescreened. The residual few agglomerates which resisted fracture in the Colton Granulator were discarded.

EXAMPLE II

Upon being well dispersed into a dry beverage powder composition containing sugar, fruit flavor, and food coloring at levels of up to about 25% of fumaric acid, the resulting dry beverage mix showed excellent solubility in one minute in 40° F. water, when employed in conventional levels of about 1% by weight of the total beverage. During seven weeks storage at various temperatures and relative humidities, especially at 90° F., and 85% relative humidity, at 90° F., and 60% relative humidity, and at 100° F., and 30% relative humidity, the dry beverage composition containing the fumaric acid prepared according to Example I, did not agglomerate and was readily soluble in cold water in one minute or less.

What is claimed and desired to be secured by Letters Patent is:

1. A method of preparing a cold water soluble food acidulent selected from the group consisting of fumaric acid and adipic acid which comprises:
   (a) subdividing the acidulent to particle sizes less than No. 400 U.S. Standard Sieve size,
   (b) impregnating the surfaces of the acidulent particles with an aqueous solution of propylene glycol,
   (c) agglomerating the propylene glycol impregnated acidulent particles,
   (d) drying the agglomerated particles, and,
   (e) subdividing the dried agglomerated particles to particle sizes of less than No. 120 U.S. Standard Sieve size.

2. The method of claim 1 wherein the acid is fumaric acid.

3. The method of claim 1 wherein the acid is adipic acid.

4. The method of claim 1 wherein the dried agglomerated acidulent particles contain from about 0.5% to about 20% propylene glycol by weight of the particles.

References Cited

UNITED STATES PATENTS

| | | | |
|---|---|---|---|
| 3,009,810 | 11/1961 | Raffensperger et al. | 99—78 |
| 3,152,909 | 10/1964 | Raffensperger et al. | 99—78 |
| 3,181,953 | 5/1965 | Van Ness et al. | 99—78 |
| 3,370,956 | 2/1968 | Reitman et al. | 99—78 |

MORRIS O. WOLK, Primary Examiner

S. B. DAVIS, Assistant Examiner

U.S. Cl. X.R.

99—199; 252—363.5